US007087804B2

(12) United States Patent
O'Rear

(10) Patent No.: US 7,087,804 B2
(45) Date of Patent: Aug. 8, 2006

(54) USE OF WASTE NITROGEN FROM AIR SEPARATION UNITS FOR BLANKETING CARGO AND BALLAST TANKS

(75) Inventor: Dennis J. O'Rear, Petaluma, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 367 days.

(21) Appl. No.: 10/464,543

(22) Filed: Jun. 19, 2003

(65) Prior Publication Data

US 2004/0259961 A1  Dec. 23, 2004

(51) Int. Cl.
*C10G 7/20* (2006.01)
*C10G 1/04* (2006.01)

(52) U.S. Cl. .................. 585/899; 585/733; 585/702; 585/703; 518/700

(58) Field of Classification Search ........... 585/899, 585/733, 702, 703; 518/700
See application file for complete search history.

(56) References Cited

U.S. PATENT DOCUMENTS

| 4,086,066 A | 4/1978 | McDermott |
| 4,188,380 A | 2/1980 | Oswald |
| 4,568,663 A | 2/1986 | Mauldin |
| 4,706,751 A | 11/1987 | Gondouin |
| 4,853,140 A | 8/1989 | Payne et al. |
| 4,867,757 A | 9/1989 | Payne |
| 4,946,476 A | 8/1990 | Najjar et al. |
| 5,055,325 A | 10/1991 | Trivett |
| 5,146,756 A | 9/1992 | Lavin |
| 5,265,429 A | 11/1993 | Dray |

(Continued)

FOREIGN PATENT DOCUMENTS

EP    0 609 079    8/1994

(Continued)

OTHER PUBLICATIONS

Tamburri, M.N., et al., "Ballast water deoxygenation can prevent aquatic introductions while reducing ship corrosion", *Biological Conservation* 103:331-341 (2002).

(Continued)

*Primary Examiner*—Tam M. Nguyen
(74) *Attorney, Agent, or Firm*—Buchanan Ingersoll PC

(57) ABSTRACT

The present invention relates to the use of a primarily nitrogen containing blanketing agent from the air separation unit of a Gas To Liquids, Heavy Hydrocarbon Conversion, or Methanol Synthesis Facility on transport vessels. The primarily nitrogen containing blanketing agent is used to reduce corrosion, reduce product biodegradation and oxidation, control invasive species, and prevent fires and explosions by reducing oxygen content. Accordingly, the present invention relates to integrated processes for producing hydrocarbonaceous products and using a primarily nitrogen containing blanketing agent supplied from the process in shipping the products.

18 Claims, 1 Drawing Sheet

U.S. PATENT DOCUMENTS

| | | | |
|---|---|---|---|
| 5,416,210 | A | 5/1995 | Sherba et al. |
| 5,433,863 | A | 7/1995 | Braden et al. |
| 5,437,160 | A | 8/1995 | Darredeau et al. |
| 5,635,541 | A | 6/1997 | Smith et al. |
| 5,787,713 | A | 8/1998 | Russo |
| 5,932,112 | A | 8/1999 | Browning, Jr. |
| 6,069,142 | A | 5/2000 | Gaffney et al. |
| 6,075,061 | A | 6/2000 | Wittenbrink et al. |
| 6,162,956 | A | 12/2000 | Berlowitz et al. |
| 6,171,508 | B1 | 1/2001 | Browning, Jr. |
| 6,214,258 | B1 | 4/2001 | Woodward et al. |
| 6,248,794 | B1 | 6/2001 | Gieskes |
| 6,345,517 | B1 | 2/2002 | Jahnke |
| 6,518,321 | B1 | 2/2003 | O'Rear et al. |
| 6,541,524 | B1 | 4/2003 | O'Rear et al. |
| 6,569,909 | B1 | 5/2003 | O'Reilly et al. |
| 6,596,781 | B1 | 7/2003 | Schinski |
| 6,626,122 | B1 | 9/2003 | O'Reilly et al. |
| 2003/0127399 | A1 | 7/2003 | O'Reilly et al. |
| 2003/0162845 | A1 | 8/2003 | O'Reilly et al. |

FOREIGN PATENT DOCUMENTS

EP    0 921 184 A1    6/1999

OTHER PUBLICATIONS

Seawater Corrosion Handbook, M. Schumacher editor, Noyes Data Corporation, Park Ridge, NJ (1979).

Martin, R., "The New Supertanker Plague" *Wired* (2002) 129-131 and 149-150.

Speight, J.G., "Guels, Synthetic Gaseous Fuels" *Kirk-Othmer Encyclopedia of Chemical Technology* (1994) (online).

"Methanol" *Kirk-Othmer Encyclopedia of Chemical Technology* (1995) (online).

Agrawal, R., et al., "Cryogenics", *Kirk-Othmer Encyclopedia of Chemical Technology* (1993) (online).

Agrawal, R., et al., "Heat Exchangers in Cryogenics", *Kirk-Othmer Encyclopedia of Chemical Technology*, Section 7.2 (1993) (online).

Global Spread of Microorganisms By Ships, Brief Communications *Nature* Nov. 2, 2002.

International Search Report dated Sep. 23, 2005.

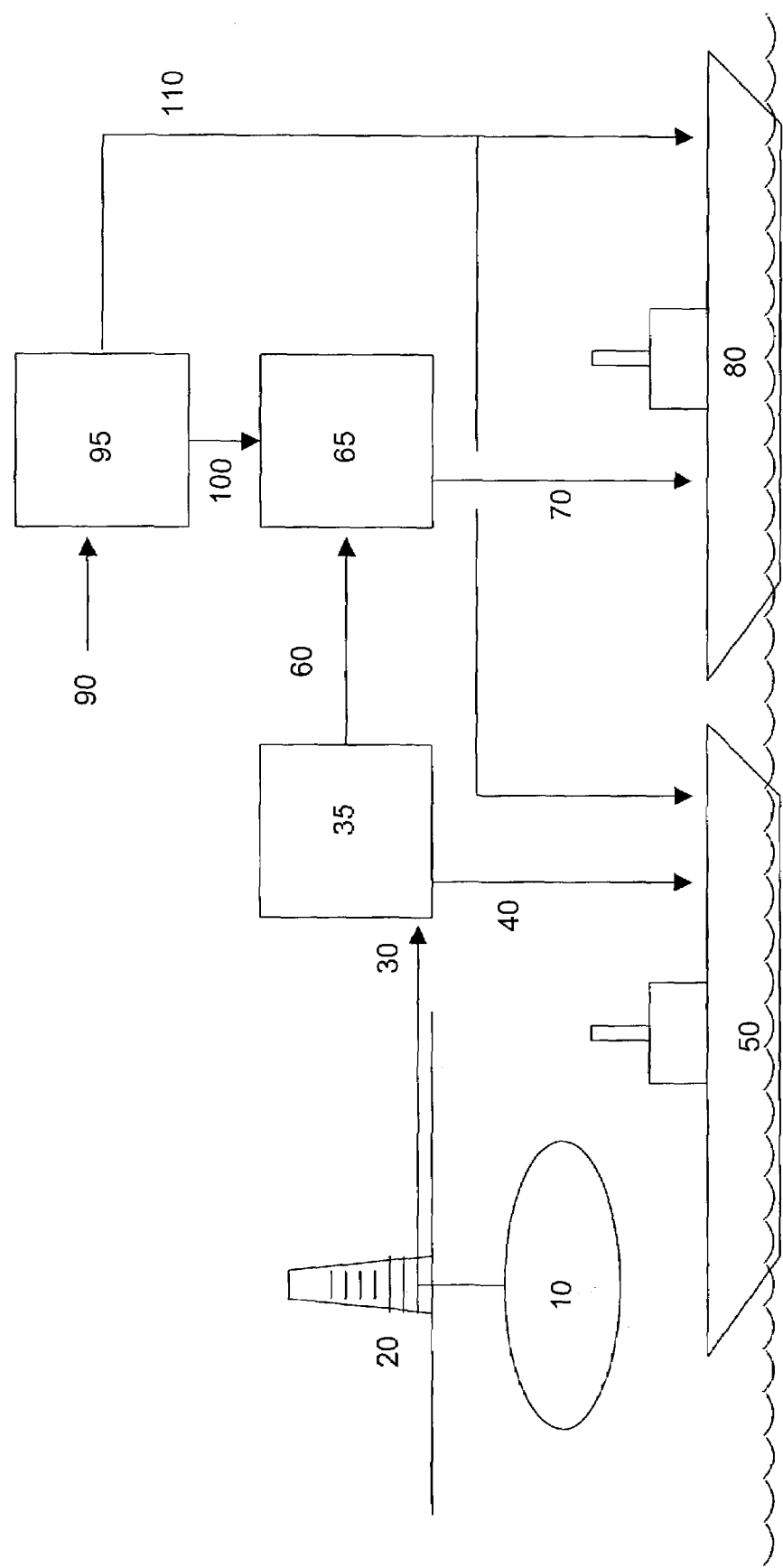

USE OF WASTE NITROGEN FROM AIR SEPARATION UNITS FOR BLANKETING CARGO AND BALLAST TANKS

FIELD OF THE INVENTION

The present invention is related to an integrated process for the production and transportation of hydrocarbonaceous products in transport vessels, and more particularly to an integrated process for the production and transportation of Fischer-Tropsch products in transport vessels.

BACKGROUND OF THE INVENTION

In the transportation of products, in particular hydrocarbonaceous products, by transport vessels, several problems are often encountered. These problems include product biodegradation, product oxidation, corrosion, transfer of invasive species, and fires and explosions. During transportation, the hydrocarbonaceous products may be subject to biodegradation by microorganisms. In particular, hydrocarbonaceous products are frequently exposed to a layer of water when stored in large storage vessels fuel tanks of aircraft and holds of tankers. In these large storage vessels, water invariably forms due to condensation or it is initially present in the stored hydrocarbonaceous product and slowly separates therefrom. This water gradually forms a layer in the bottom of the storage vessels. The water layer forms an interface with the hydrocarbonaceous product, and becomes a breeding ground for a wide variety of microorganisms. These microorganisms utilize the hydrocarbonaceous product as a nutrient and can multiply.

Eventually the microorganisms can consume a portion of the hydrocarbonaceous product. The extent to which the microorganisms consume the product is known as the extent of biodegradation, or the biodegradability of the product.

The microorganisms or microbes will grow mostly in the water phase, but when the hydrocarbonaceous product is disturbed during pumping or mixing, the microbes can be dispersed into the hydrocarbonaceous product and cause contamination. When present in the hydrocarbonaceous product, microbial growth can present a problem for several reasons. For example, hydrocarbonaceous products may become contaminated with microbes during storage or shipment and as a result of the microbes, become hazy or cloudy. The growing microorganisms may form sludge in the contaminated hydrocarbonaceous product. When contaminated hydrocarbonaceous products are used in an engine or equipment, the microbes and/or the sludge may decrease the efficiency of the engine or equipment or prevent it from functioning altogether, for example, by plugging filters. In addition, growth of microorganisms, in particular anaerobic sulfate reducing bacteria, in hydrocarbonaceous products during storage or transport may create corrosive sulfur-containing acids and damage the vessels in which the products are contained. This corrosion damage may lead to the need for eventual replacement of these large, expensive vessels.

In addition to biodegradation by microorganisms, there is also the potential that microorganisms and higher life forms may be transported to environments previously uninhabited by these organisms. Transport of water on marine tankers, in particular ballast water, contaminated with microbes creates a dispersal mechanism for human pathogens, waterborne diseases of plants and animals, and foreign organisms into the environment. Ballast water is a breeding ground for organisms and is implicated in introducing foreign organisms into the environment. Ballast water is used on ships in order to maintain appropriate ship draft, trim, stability, immersion, and hull integrity. Ballast water may be taken on in special ballast tanks or may be taken on in the cargo tanks of a ship. Ships travel with ballast water when carrying no cargo or light cargo and travel with little or no ballast on board when carrying a maximum cargo. The quantity of ballast water used in a ship can be quite large. For example, a 300,000 metric ton petroleum tanker has a ballast water capacity of 100,000 metric tons. Typically, the ratio of ballast water to ship capacity is 1:3 to 1:2.

Ballast water is normally taken on in one coastal region and is discharged in another coastal region. For example, ships take on ballast water from one port, travel to a second port, and discharge a large amount of ballast water in order to take on cargo at the second port. The discharge of ballast water has led to the introduction of non-native life forms in many areas, as the life forms from one coastal region to another vary. Even ships reporting no ballast on board may act as vectors for non-native life forms because the ballast tanks of such ships contain an unpumpable amount of residual ballast water.

For example, infectious bacteria such as cholera have been found in ballast water from marine tankers ("Global Spread of Microorganisms By Ships," *Brief Communications* Nov. 2, 2000 issue of Nature). These infectious organisms can create both a human health problem, and a health problem to native species in the receiving country. Water can also be the vehicle for the introduction of foreign higher life forms into the receiving countries' environment. By this route, Zebra clams are believed to have been introduced into the San Francisco Bay region.

One proposed method of limiting the introduction of foreign organisms into marine environments is for ships to discharge their ballast water in the open ocean prior to entering port without taking on new ballast water. However, as mentioned above, ballast water is typically needed to maintain essential operating conditions of a ship, and it may be dangerous to discharge ballast water before reaching a port.

Another method for limiting the introduction of life forms in ballast water is to exchange near-coast ballast water for mid-ocean ballast water. Presumably, the life forms taken on board the ship in a near-coast environment are flushed into the mid-ocean. It is important that the ship maintain stability, draft, and other operating parameters during this exchange, and only ships that are designed for this practice can safely exchange ballast water. Ships may be retrofitted to permit this exchange, but such retrofitting is very expensive. Currently only a small proportion of the world's cargo fleet is capable of ballast water exchange. Ballast water exchange may be completed by (1) emptying the ballast tanks and refilling them one at a time, or (2) pumping three volumes of ocean water into the tanks to flush them. Neither approach is completely effective in eliminating foreign life forms. The first method leaves a heal in the tank which can harbor life forms, and the second method allows life forms to be retained during the mixing. The effectiveness of ballast water exchange has been estimated at 90% and usually takes about 2 days to safely complete. Because the above methods are not as effective or efficient as ideally desired, other methods of controlling the transfer of life forms need to be proposed.

During transportation, the hydrocarbonaceous products may be subject to oxidation and the ballast and cargo tanks on the ship may be subject to corrosion. During transportation, the hydrocarbonaceous product can oxidize. Although environmentally friendly, Fischer Tropsch products can oxidize relatively rapidly when exposed to air. The rapid oxidation may be due to a lack natural anti-oxidants, such as sulfur compounds. Further, some of the products produced by the Fischer Tropsch process may be waxy, and these products are frequently are shipped at elevated temperature. Shipping at elevated temperatures increases the tendency of Fischer Tropsch products to oxidize.

Corrosion on ships has been linked to several major disasters. Most prominent was the 1999 sinking of the oil tanker Erika which spilled millions of gallons of fuel oil on the coast of France. The French government found that corrosion was one of the strong contributing factors that lead to the sinking of this ship. Other ship losses attributed in part to corrosion include the Nakhodka in 1997 and the Castor in 2000. One method to prevent corrosion is to paint the metal surfaces of ships or coat them with a corrosion-resistant substance. However, it is very difficult to coat all surfaces, and any uncoated surface can lead to problems.

During transportation of hydrocarbonaceous products on marine vessels, there is the potential of fires and explosions on the transport vessels. When transporting methanol, from, for example a methanol synthesis process, methanol is quite flammable and precautions to prevent fires and explosions must be taken when shipping it. Regulations that minimize the chances of the fires and explosions on transport vessels are covered in the Safety Of Life At Sea (SOLAS) international treaty. The 1978 SOLAS Protocol was adopted at the International Conference on Tanker Safety and Pollution Prevention, which was convened in response to a spate of tanker accidents in 1976–1977. As a result, an inert gas system became mandatory for existing petroleum carriers of 70,000 deadweight tons (dwt) and above by May 1, 1983, and for ships of 20,000–70,000 dwt by May 1, 1985.

Requirements for the removal of oxygen, or "inerting the tank", from the cargo space of volatile petroleum products are recognized in regulations such as the United States Coast Guard regulations. The regulations require that the oxygen content of the gas phase in contact with the petroleum product be less than 8 volume %.

A typical method to inert petroleum cargo spaces is to take exhaust from the steam boilers or from diesel engines used to pump petroleum onto the vessel, scrub it with sea water, and use the scrubbed gas to inert the tanks. The exhaust gas contains carbon dioxide, nitrogen, and low levels of oxygen, sulfur oxides, and nitrogen oxides. Oxygen content of the scrubbed gas is monitored to ensure that it is below 5 volume %, providing assurance that the gas in contact with the petroleum product will be less than 8 volume % oxygen. Scrubbed gas can also be used to inert the ballast tanks. Inerting the cargo tanks is most important when petroleum is being unloaded as some gas must be introduced into the tank to displace the petroleum. During loading, the tank should have been previously inerted, and the petroleum displaces this gas. The steam boilers and diesel engines used to pump petroleum off the vessel are typically located on-board the vessel.

While scrubbed gas is an inexpensive source of inert gas, the scrubbing system may not be completely effective in removing carbon dioxide, nitrogen oxides, and sulfur oxides. Carbon dioxide in the scrubbed gas can lead to corrosion of tanks. Traces of nitrogen oxides, themselves oxidants, can oxidize Fischer-Tropsch products. Finally, traces of sulfur oxides can be incorporated in Fischer-Tropsch products, thereby increasing their sulfur content and reducing their value as low sulfur fuels. Better sources of inexpensive inert gas are desired. What is needed is an efficient and inexpensive way to address the problems of product biodegradation, product oxidation, corrosion, transfer of invasive species, and fires and explosions on transport vessels.

SUMMARY OF THE INVENTION

In one aspect, the present invention relates to an integrated process for the production and transportation of a hydrocarbonaceous product in a transport vessel containing one or more ballast tanks, one or more cargo tanks, and optionally one or more liquid nitrogen storage tanks. The process comprises obtaining a hydrocarbon asset and separating air into a primarily oxygen containing gas and a primarily nitrogen containing blanketing agent. The primarily oxygen containing gas is reacted with the hydrocarbon asset to form syngas and the syngas is converted into a hydrocarbonaceous product. At least a portion of the hydrocarbonaceous product is transferred into at least one of the cargo tanks and at least a portion of the primarily nitrogen containing blanketing agent is transferred to the transport vessel. At least a portion of the primarily nitrogen containing blanketing agent is used to blanket at least one of the tanks on the vessel. Preferably, the primarily nitrogen containing blanketing agent is used to blanket the cargo tank containing the hydrocarbonaceous product during transportation. Preferably, the process to convert the syngas into a hydrocarbonaceous product is either a Fischer Tropsch process or a methanol synthesis process.

In yet another aspect, the present invention relates to a transport vessel. The transport vessel comprises at least one cargo tank for holding a hydrocarbonaceous product selected from the group consisting of petroleum, a hydrocarbonaceous product from a Gas to Liquids Facility, a product from a Heavy Hydrocarbon Conversion Facility, methanol, and mixtures thereof, at least one ballast tank; at least one liquid nitrogen storage container for holding liquid nitrogen, wherein the liquid nitrogen is supplied from an on-shore air separations plant associated with a facility for preparing a product selected from the group consisting a hydrocarbonaceous product from a Gas to Liquids Facility, a product from a Heavy Hydrocarbon Conversion Facility, methanol, and mixtures thereof; and a system to use the liquid nitrogen to reduce oxygen content of an on-board tank.

In yet a further aspect the present invention relates to a primarily nitrogen containing blanketing agent. The primarily nitrogen containing blanketing agent comprises an oxygen content of less than 5 volume %; and a nitrogen content of greater than 90 volume % wherein the nitrogen containing blanketing agent is supplied from an on-shore air separations plant associated with a facility to produce a product selected from the group consisting of a product from a Gas To Liquids Facility, a product from a Heavy Hydrocarbon Conversion Facility, methanol, and mixtures thereof. The primarily nitrogen containing blanketing agent is used to reduce oxygen content of a ship-board tank. Preferably the primarily nitrogen containing blanketing agent also comprises an odorant.

In yet another aspect the present invention relates to a process for transporting a hydrocarbonaceous product, including a first site and a second site, remote from each other, wherein the first site forms the hydrocarbonaceous product to be used at the second site. The process comprises receiving at the second site the hydrocarbonaceous product. The hydrocarbonaceous product is made at the first site by a process comprising obtaining a hydrocarbon asset and separating air into a primarily oxygen containing gas and a primarily nitrogen containing blanketing agent. The primarily oxygen containing gas is reacted with the hydrocarbon asset to form syngas, and the syngas is hydrocarbonaceous products. At least a portion of the hydrocarbonaceous product is transferred into at least one cargo tank on a transport vessel; and at least a portion of the primarily nitrogen containing blanketing agent is used to blanket at least one tank on the transport vessel during transportation, wherein the tank is selected from the group consisting a cargo tank, a ballast tank, a liquid nitrogen storage tank, and combinations thereof. The hydrocarbonaceous product is transferred from the transport vessel to a storage container at the second site. The process to form the hydrocarbonaceous is preferably a Fischer Tropsch process.

BRIEF DESCRIPTION OF THE DRAWINGS

The FIGURE is a schematic flow diagram of one embodiment of the invention.

DETAILED DESCRIPTION OF THE INVENTION

The present invention relates to an integrated process for the production and transportation of a hydrocarbonaceous product in a transport vessel containing one or more ballast tanks and one or more cargo tanks. The transport vessel may optionally also comprise one or more liquid nitrogen storage tanks. In the present invention, a nitrogen containing blanketing agent is used to blanket the hydrocarbonaceous product in the cargo tank and optionally the ballast tank. Advantageously, this nitrogen containing blanketing agent is produced as part of the process for obtaining the hydrocarbonacous product. Accordingly, the present invention also relates to a transport vessel for transporting the hydrocarbonaceous product wherein the marine vessel is equipped to store and use the nitrogen containing blanketing agent from the process to produce the product. The present invention further relates to the primarily nitrogen containing blanketing agent.

DEFINITIONS

The following terms will be used throughout the specification and will have the following meanings unless otherwise indicated.

"Biocide" means a substance that kills or inhibits the growth of microorganisms, such as, for example, bacteria, molds, slimes, fungi, and the like.

"Gas To Liquids" (GTL) refers to a process that converts natural gas to low-emission liquid fuels. Preferably, this process is a Fischer-Tropsch process or a methanol synthesis process.

"Hydrocarbon asset" include natural gas, petroleum, tar sands, oil shale, coal, and heavy oils found in abundant supply in locations that are remote from the markets for the hydrocarbonaceous products.

"Heavy hydrocarbon" means coal, refinery sludge, refinery coke, municipal sewage sludge, recycled plastic petroleum products such as residual stocks, heavy gas oils, and the like, and mixtures thereof. A heavy oil is one that contains portions boiling above 1000° F.

"Heavy Hydrocarbon Conversion" refers to the conversion of a heavy hydrocarbon to products comprising synthesis gas by reaction with a gaseous oxidant ($O_2$, steam, air, and mixtures thereof). In particular, heavy hydroconversion processes include processes such as coal conversion and upgrading of heavy oil.

"Hydrocarbonaceous product" means a material containing hydrogen, carbon, and optionally other heteroatoms such as oxygen, sulfur, and nitrogen. Examples of hydrocarbonaceous products include petroleum, petroleum products, methanol, and Fischer-Tropsch products.

"Integrated process" means a process comprising a sequence of steps, some of which may be parallel to other steps in the process, but which are interrelated or in some way dependent upon either earlier or later steps in the total process. Thus, a nitrogen feed to a step in the integrated process comprises a product from a preceding step in the process; alternatively, a product of a step in the integrated process is a feed, either alone or as a blend with other feeds, for one or more subsequent steps in the integrated process.

"Methanol Synthesis" refers to the synthesis of methanol, such as by high-pressure catalytic synthesis from carbon monoxide and hydrogen, or the partial oxidation of natural gas hydrocarbons.

"Microbe" means microorganism.

"Primarily oxygen containing gas" means a gas containing at least 90 volume % oxygen, preferably at least 95 volume % oxygen, and most preferably 99 volume % oxygen.

"Primarily nitrogen containing blanketing agent" means a gas or liquid containing very low oxygen content and a high nitrogen content. A primarily nitrogen containing blanketing agent contains less than 5 volume % oxygen, preferably less than 1 volume %, and more preferably less than 0.1 volume %. A primarily nitrogen containing blanketing agent contains at least 90 volume % nitrogen, preferably at least 95 volume %, and more preferably at least 98 volume % nitrogen. The primarily nitrogen containing blanketing agent may also contain minor amounts of an odorant or other impurities such as inert gas elements (including, for example, neon, argon, and the like), carbon dioxide, water vapor, and mixtures thereof.

"Syngas" means a mixture that includes hydrogen and carbon monoxide. In addition to these species, others may also be present, including, for example, water, carbon dioxide, unconverted light hydrocarbon feedstock, and various impurities. A typical syngas contains at least 5 mol% of each CO and $H_2$, preferably at least 20% of each, and even more preferably at least 30% of each. The syngas has a molar ratio of $H_2$ to CO between 0.5 and 3, preferably between 1.25 and 2.25.

The term "derived from a Fischer Tropsch process" or "Fischer Tropsch derived" means that the product, fraction, or feed originates from or is produced at some stage by a Fischer-Tropsch process.

It has been discovered that air separation units can be used as an inexpensive source of a primarily nitrogen containing blanketing agent. This agent may be collected in the form of a gas or liquid. The primarily nitrogen containing agent can be used to blanket cargo tanks and optionally ballast tanks on transport vessels, in particular marine cargo vessels used to carry hydrocarbonaceous products.

Air separation processes to make and use oxygen are known in the art. As a by-product of the air separations process, nitrogen is produced. In an air separation process, air is purified to remove water and other contaminants. This process is conducted by liquefying the air through a series of compression, chilling, and expansion steps. Air separation processes are well known to those of skill in the art and are as described in "Cryogenics," Agrawal, Rakesh, et. al,

*Kirk-Othmer Encylopedia of Chemical Technology*, (1993) (online). The resulting liquefied air is distilled to obtain the primarily oxygen containing gas and the primarily nitrogen containing agent. Both of these two products may be obtained as a gas or liquid.

This primarily nitrogen containing blanketing agent is isolated from the air separations unit. Accordingly air separation units can be used to produce a primarily nitrogen containing blanketing agent. The primarily nitrogen containing blanketing agent isolated from the air separation process comprises an oxygen content of less than 5 volume % and a nitrogen content of greater than 90 volume %. As described herein, an odorant may be added to the primarily nitrogen containing blanketing agent prior to use.

Air separation units are typically associated with processes for producing hydrocarbonaceous products, including Gas to Liquid processes, Heavy Hydrocarbon conversion processes, and methanol synthesis processes. Accordingly, air separation units are typically located in remote locations associated with the conversion of an energy source such as gas or coal into a portable form such as transportation fuel. This conversion can be accomplished by the above-listed processes for producing hydrocarbonaceous products.

For instance, air separations processes to make and use oxygen in Gas to Liquids operations are described in U.S. Pat. Nos. 6,214,258; 5,635,541; and 5,146,756, the contents of which are incorporated by reference in their entirety. Also, air separations processes used to make and use oxygen in heavy hydrocarbon conversion operation are described in U.S. Pat. Nos. 5,265,429; 5,437,160; 4,946,476; and 6,345,517, the contents of which are incorporated by reference in their entirety.

In a Fischer Tropsch synthesis process, natural gas, which is mostly methane, is converted to synthesis gas, or syngas, which is a mixture of carbon monoxide and hydrogen. In a Fischer Tropsch process an air separation unit is present to produce oxygen. Oxygen is used to partially oxidize methane to make synthesis gas as illustrated by the following reaction:

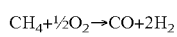

$$CH_4 + \tfrac{1}{2}O_2 \rightarrow CO + 2H_2$$

The synthesis gas is converted to Fischer Tropsch derived products (represented as $C_nH_{2n+2}$) as illustrated by the following reaction:

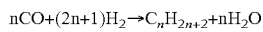

$$nCO + (2n+1)H_2 \rightarrow C_nH_{2n+2} + nH_2O$$

Catalysts and conditions for performing Fischer-Tropsch synthesis are well known to those of skill in the art, and are described, for example, in EP 0 921 184 A1. In the Fischer-Tropsch synthesis process, liquid and gaseous hydrocarbons are formed by contacting a synthesis gas (syngas) comprising a mixture of $H_2$ and CO with a Fischer-Tropsch catalyst under suitable temperature and pressure reactive conditions. The Fischer-Tropsch reaction is typically conducted at temperatures of from about 300° to 700° F. (149° to 371° C.), preferably from about 400° to 550° F. (204° to 228° C.); pressures of from about 10 to 600 psia, (0.7 to 41 bars), preferably 30 to 300 psia, (2 to 21 bars) and catalyst space velocities of from about 100 to 10,000 cc/g/hr., preferably 300 to 3,000 cc/g/hr.

The products may range from $C_1$ to $C_{200+}$ with a majority in the $C_5$ to $C_{100+}$ range, and the products may be distributed in one or more product fractions. The reaction can be conducted in a variety of reactor types, for example, fixed bed reactors containing one or more catalyst beds; slurry reactors; fluidized bed reactors; and a combination of different type reactors. Such reaction processes and reactors are well known and documented in the literature.

Slurry Fischer-Tropsch processes utilize superior heat (and mass) transfer characteristics for the strongly exothermic synthesis reaction and are able to produce relatively high molecular weight, paraffinic hydrocarbons when using a cobalt catalyst. In a slurry process, a syngas comprising a mixture of $H_2$ and CO is bubbled up as a third phase through a slurry in a reactor which comprises a particulate Fischer-Tropsch type hydrocarbon synthesis catalyst dispersed and suspended in a slurry liquid comprising hydrocarbon products of the synthesis reaction which are liquid at the reaction conditions. The mole ratio of the hydrogen to the carbon monoxide may broadly range from about 0.5 to 4, but is more typically within the range of from about 0.7 to 2.75 and preferably from about 0.7 to 2.5. A particularly preferred Fischer-Tropsch process is taught in EP 0609079, incorporated herein by reference in its entirety.

Suitable Fischer-Tropsch catalysts comprise one or more Group VIII catalytic metals such as Fe, Ni, Co, Ru and Re. Additionally, a suitable catalyst may contain a promoter. Thus, a preferred Fischer-Tropsch catalyst comprises effective amounts of cobalt and one or more of Re, Ru, Pt, Fe, Ni, Th, Zr, Hf, U, Mg and La on a suitable inorganic support material, preferably one which comprises one or more refractory metal oxides. In general, the amount of cobalt present in the catalyst is between about 1 and about 50 weight percent of the total catalyst composition. The catalysts can also contain basic oxide promoters such as $ThO_2$, $La_2O_3$, MgO, and $TiO_2$, promoters such as $ZrO_2$, noble metals (Pt, Pd, Ru, Rh, Os, Ir), coinage metals (Cu, Ag, Au), and other transition metals such as Fe, Mn, Ni, and Re. Support materials including alumina, silica, magnesia and titania or mixtures thereof may be used. Preferred supports for cobalt containing catalysts comprise titania. Useful catalysts and their preparation are known and illustrative, but non-limiting examples may be found, for example, in U.S. Pat. No. 4,568,663.

The products from Fischer-Tropsch reactions performed in slurry bed reactors generally include a light reaction product and a waxy reaction product. The light reaction product (i.e. the condensate fraction) includes hydrocarbons boiling below about 700° F. (e.g., tail gases through middle distillates), largely in the $C_5$–$C_{20}$ range, with decreasing amounts up to about $C_{30}$. The waxy reaction product (i.e., the wax fraction) includes hydrocarbons boiling above 600° F. (e.g., vacuum gas oil through heavy paraffins), largely in the $C_{20+}$ range, with decreasing amounts down to $C_{10}$. Both the light reaction product and the waxy product are substantially paraffinic. The products generally comprise greater than 70% normal paraffins, and often greater than 80% normal paraffins. The light reaction product comprises paraffinic products with a significant proportion of alcohols and olefins. In some cases, the light reaction product may comprise as much as 50%, and even higher, alcohols and olefins. In the Fischer-Tropsch process, the desired Fischer-Tropsch products typically will be isolated by distillation.

The product from the Fischer-Tropsch process may be further processed using, for example, hydrocracking, hydroisomerization, and hydrotreating. Such processes crack the larger synthesized molecules into fuel range and lube range molecules with more desirable boiling points, pour points, and viscosity index properties. Such processes may also saturate oxygenates and olefins to meet the particular needs of a refinery. These processes are well known in the art and do not require further description here.

Accordingly, a Fischer-Tropsch process may be used to generate Fischer-Tropsch derived products to be transported in the cargo tank of a transport vessel and the air separations unit used in the Fischer Tropsch process may be used to produce a primarily nitrogen containing blanketing agent. In this integrated process a hydrocarbon asset is obtained, and air is separated into a primarily oxygen containing gas and a primarily nitrogen containing blanketing agent. The primarily oxygen containing gas is reacted with the hydrocarbon asset to form syngas and the syngas is converted into a hydrocarbonaceous product by a Fischer Tropsch process. At least a portion of the hydrocarbonaceous product is transferred or pumped into at least one of the cargo tanks and at least a portion of the primarily nitrogen containing blanketing agent is transferred or pumped to the transport vessel. At least a portion of the primarily nitrogen containing blanketing agent is used to blanket the cargo tank containing the hydrocarbonaceous product during transportation. In addition, the primarily nitrogen containing blanketing agent may optionally be used to blanket the ballast tanks.

In a Methanol synthesis process, natural gas, which is mostly methane, is converted to synthesis gas, or syngas, which is a mixture of carbon monoxide and hydrogen. In a Methanol synthesis process an air separation unit is present to produce oxygen. Oxygen is used to partially oxidize methane to make synthesis gas as illustrated by the following reaction:

$$CH_4 + \tfrac{1}{2}O_2 \rightarrow CO + 2H_2$$

The synthesis gas is converted to methanol as illustrated by the following reaction:

$$CO + 2H_2 \rightarrow CH_3OH$$

Catalysts and conditions for performing Methanol synthesis are well known to those of skill in the art, and are described, for example, in "Methanol", *Kirk-Othmer Encyclopedia of Chemical Technology*, (1995) (online), the contents of which are herein incorporated by reference in their entirety. Modern methanol synthesis uses catalysts comprising copper, zinc, and alumina. They operate at 5–10 Mpa and 210–270° C. and produce over 2200 tons per day.

Accordingly, a Methanol synthesis process may be used to generate methanol to be transported in the cargo tank of a marine vessel and the air separations unit used in the Methanol synthesis process may be used to produce a primarily nitrogen containing blanketing agent. In this integrated process a hydrocarbon asset is obtained, and air is separated into a primarily oxygen containing gas and a primarily nitrogen containing blanketing agent. The primarily oxygen containing gas is reacted with the hydrocarbon asset to form sygas, and the syngas is converted into methanol by a methanol synthesis process. At least a portion of the methanol is pumped into at least one of the cargo tanks, and at least a portion of the primarily nitrogen containing blanketing agent is pumped to the marine vessel. At least a portion of the primarily nitrogen containing blanketing agent is used to prevent oxidation and combustion of the methanol during transportation. In addition, the primarily nitrogen containing blanketing agent may optionally be used to blanket the ballast tanks.

In a heavy hydrocarbon conversion heavy oil, coal, or other solid hydrocarbonaceous products are converted synthesis gas by reaction of the heavy oil, coal, or solid hydrocarbonaceous product with a gaseous oxidant. In a heavy hydrocarbon conversion process an air separation unit is present to produce oxygen. Oxygen is used to partially oxidize the heavy hydrocarbon to make synthesis gas. Steam is often added to promote the water gas shift reaction to convert CO into $H_2$ and achieve the desired synthesis gas molar ration. Catalysts and conditions for performing heavy hydrocarbon conversion are well known to those of skill in the art, and are described, for example, in "Fuels, Synthetic Gaseous Fuels," Speight, James G., *Kirk-Othmer Encylcopedia of Chemical Technology* (1994) (online).

Accordingly, a heavy hydrocarbon conversion process may be used to generate syngas and subsequently Fischer Tropsch derived products, methanol, or mixtures thereof to be transported in the cargo tank of a transport vessel, and the air separations unit used in the process may be used to produce a primarily nitrogen containing blanketing agent. In this integrated process primarily nitrogen containing blanketing agent is used to blanket the Fischer Tropsch derived products or methanol in the cargo tanks of the transport vessel. In addition, the primarily nitrogen containing blanketing agent may optionally be used to blanket the ballast tanks.

According to the present invention a primarily nitrogen containing blanketing agent is isolated from an air separation unit. The primarily nitrogen containing blanketing agent may be isolated by liquefaction and distillation of air and then stored in an appropriate storage container as either a liquid (liquid nitrogen) or a compressed gas until needed on a transport vessel.

The primarily nitrogen containing blanketing agent may be in the form of a gas, a compressed gas, or liquid nitrogen. If in the form of liquid nitrogen, the primarily nitrogen containing blanketing agent from the air separations unit is converted to liquid nitrogen by withdrawing a liquid nitrogen product form the distillation unit of the air separator. The primarily nitrogen containing blanketing agent may be shipped onboard a transport vessel, stored, and used as a gas, a compressed gas, or as liquid nitrogen. Preferably if the nitrogen containing blanketing agent is liquid nitrogen, it is converted to a gas for use; however, it may be used directly as liquid nitrogen. If liquid nitrogen is to be converted into a gas prior to use, it is vaporized by a heat exchange. The source of heat to vaporize the liquid nitrogen can come a variety of sources.

If the primarily nitrogen containing blanketing agent is in the form of liquid nitrogen, the liquid nitrogen also represents an energy source. The energy released from the gasification of liquid nitrogen to provide the gas for blanketing the cargo and ballast tanks can be used for many purposes, including air conditioning, cooling water generation, and ship propulsion. Sufficient nitrogen containing blanketing agent can be stored onboard the ship so that the tanks can be blanketed upon their return voyage. Cargo tanks may either be empty or contain backhaul products that also benefit from being blanketed with the nitrogen containing blanketing agent. Nitrogen can be produced from the air separation unit in quantities such that it exceeds the amount needed for the vessel on which it is stored. The excess nitrogen can be used to reduce the oxygen content of the tanks of other vessels or for other typical uses for nitrogen, such as inert blanketing gas for other vessels or other uses, ammonia synthesis, and the like.

The primarily nitrogen containing blanketing agent from the air separations unit can be stored on board the ship in a storage container and can be used at a later time to blanket the cargo tanks and optionally the ballast tanks after the hydrocarbonaceous product has been delivered. Advantageously, the primarily nitrogen containing blanketing agent from an air separations unit associated with a process to produce hydrocarbonaceous products can be use onboard the same transport vessels that are used to transport the hydrocarbonaceous products to sites for upgrading or further refining or to market.

According to the present invention, the primarily nitrogen containing blanketing agent from the air separations unit is used onboard transport vessels to blanket cargo tanks and optionally to blanket ballast tanks. The marine vessel is used to transport petroleum, a hydrocarbonaceous product from a Gas to Liquids Facility, a product from a Heavy Hydrocarbon Conversion Facility, methanol, or mixtures thereof. The marine vessel comprises at least one cargo tank for holding the product and at least one ballast tank. The marine vessel further comprises at least one storage container for storing the primarily nitrogen containing blanketing agent from the air separations unit. Preferably, the storage container is a liquid nitrogen storage container and the primarily nitrogen containing blanketing agent is converted to liquid nitrogen prior to being loaded on the vessel. The transport vessel further comprises a system to use the nitrogen to reduce oxygen content of at least one of the on-board tank.

The primarily nitrogen containing blanketing agent is transferred into the cargo, and optionally the ballast, tanks by pumps for gases commonly known in the art. Typically, the gas would be stored (or vaporized) at a pressure greater than atmospheric. When needed to fill or blanket a tank, it is simply pumped or transferred into them by opening a valve and metering the amount needed. The tanks may be flushed several times with the nitrogen containing blanketing agent to ensure that the original oxygen environment is purged from the tanks. If the nitrogen containing blanketing agent is supplied to the ship in the form of a compressed gas, or preferably liquid nitrogen, a nitrogen gas can be generated from the compressed gas or liquid nitrogen by exchangers, evaporators, heaters, and combinations thereof. Typical equipment is described in "Heat Exchangers in Cryongenics," Agrawal, Rakesh, et al., *Kirk-Othmer Encyclopedia of Chemical Technology*, Section 7.2 (1993) (online). While liquid nitrogen typically would be gasified prior to use, under some situations, the direct injection of liquid nitrogen into the tanks may be appropriate.

The primarily nitrogen containing blanketing agent from the air separations unit can be used to prevent oxidation of hydrocarbonaceous products, particularly those with low sulfur levels such as Fischer Tropsch products. When a hydrocarbonaceous product, in particular a Fischer Tropsch derived product, is blanketed with the primarily nitrogen containing blanketing agent, the nitrogen containing blanketing agent acts to prevent oxidation of the product and formation of peroxides in the product. Using the primarily nitrogen containing blanketing agent does not increase is the sulfur content of the hydrocarbonaceous product and is an effective way to prevent oxidation and formation of peroxides without decreasing the value of the product.

The primarily nitrogen containing blanketing agent from the air separations unit also prevents corrosion on the transport vessels on which it is used. By removing oxygen from the interior spaces of the vessel, in particular the ballast and cargo tanks, corrosion problems are significantly reduced. Therefore, the primarily nitrogen containing blanketing agent can be used to blanket the cargo and ballast tanks, or fill empty cargo and ballast tanks, to prevent corrosion resulting from an oxygen rich environment.

The primarily nitrogen containing blanketing agent from the air separations unit further may prevent combustion of the hydrocarbonaceous products. The removal of oxygen from the cargo space of volatile hydrocarbonaceous or petroleum products is an acceptable way in which to reduce the danger of fires and explosions. Accordingly, the cargo tanks containing the hydrocarbonaceous products may be flushed and filled with the primarily nitrogen containing blanketing agent from the air separations unit to reduce the oxygen content of the gas phase in contact with the product. Using the primarily nitrogen containing blanketing agent, the oxygen content of the gas phase in contact with the product may be reduced to below eight volume percent in accordance with accepted safety regulations.

The primarily nitrogen containing blanketing agent from the air separations unit may also prevent biodegradation of the hydrocarbonaceous products and contamination of the environment with microorganisms and higher life forms transferred in ballast water. Many microorganisms and higher life forms require an oxygen rich environment in which to survive. By blanketing the cargo and ballast tanks with the primarily nitrogen containing blanketing agent, these microorganisms and higher life forms will not survive.

However, not all life forms can be effectively controlled by reducing the oxygen content of the environment, for example, by using the nitrogen containing blanketing agent of the present invention. For example, sulfate reducing bacteria use the oxygen in sulfate anions and hydrocarbons as their energy source, and many microorganisms are "facultative", meaning they can adapt from one source of oxygen to another. In addition, other microorganisms, most importantly disease-causing microorganisms, can enter a dormant state when oxygen concentration is reduced. Therefore, supplemental methods, such as the use of biocides, may be used in combination with the nitrogen containing blanketing agent of the present invention for control of organisms in the cargo tanks and in the ballast tanks.

To eliminate or reduce the biodegradation of hydrocarbonaceous products and to eliminate organisms from the ballast water, various biocides can be incorporated into the hydrocarbonaceous products and the ballast tanks. Biocides are designed to prevent the growth of a wide range of microorganisms including yeast, fungi, protozoa, algae, and bacteria.

The use of biocides to control microorganisms and invasive species is well known. For instance, U.S. Pat. No. 4,086,066 discloses that microorganism induced corrosion of storage vessels which contain a heel of water and an upper layer of hydrocarbon liquid may be prevented by adding to the hydrocarbon liquid contained in such storage vessels a water-dispersible polyvinyl alcohol package which contains a microbiocide.

U.S. Pat. No. 4,188,380 discloses that higher dialkyl lower dialkyl phosphonium chloride salts, derived via quaternarization of phosphines with primary chlorides, have unexpected biocidal properties. Such quaternary salts are broad spectrum bactericides, fungicides and algicides, and are highly effective against gram negative organisms even in hard water. U.S. Pat. No. 6,069,142 discloses synergistic antimicrobial combinations comprising 4,5-dichloro-2-N-octyl-4-isothiazolin-3-one and a mixture of a chlorinated isocyanurate and a bromide compound.

All biocides that do not adversely react with nitrogen containing blanketing agent may be used in combination with the primarily nitrogen containing blanketing agent of the present invention. The amount of conventional biocide added to the cargo and ballast tanks is that amount necessary to control biodegradation of the hydrocarbonaceous product or growth or microorganisms in the ballast water, as appropriate. This amount may be reduced when used in combination with the nitrogen containing blanketing agent of the present invention.

The effective amount of biocide to be added to or mixed with the ballast water or hydrocarbonaceous product is an amount effective to prevent visible growth of microorganisms for at least one day, preferably at least two days, more preferably at least five days, and most preferably at least 10 days under ambient conditions when exposed to a certified inoculant. Alternatively, an effective amount of biocide is an amount effective to kill a predetermined life form in an amount of at least 50%, preferably at least 75%, and most preferably at least 90% within 96 hours.

In the first test, a certified inoculant consists of a source of bacteria initially isolated at ambient conditions using a rapidly biodegradable hydrocarbonaceous product as the sole source of carbon and energy, and that has been shown to grow on the hydrocarbanaceous product through two or more successive inoculations. Visual growth or formation of microorganisms may be measured quantitatively by measuring turbidity of the product in question. Turbidity is generally measured by using a turbidity meter, for example, a Hach Co. Model 2100 P Turbidimeter. A turbidity meter is a nephelometer that consists of a light source that illuminates a water/oil sample and a photoelectric cell that measures the intensity of light scattered at a 90° angle by the particles in the sample. A transmitted light detector also receives light that passes through the sample. The signal output (units in nephelometric turbidity units or NTUs) of the turbidimeter is a ratio of the two detectors. Meters can measure turbidity over a wide range from 0 to 1000 NTUs. The instrument must meet US-EPA design criteria as specified in US-EPA method 180.1.

By way of example, typical lube base oils measured at 75° F. have ranges of from 0 to 20 NTUs. Commercial Poly Alpha Olefins (PAOs) tend to have NTUs between 0 and 1. The visual formation of microorganisms is said to occur when the NTU value increases by two units from measurements made before and after microorganisms or inoculant are introduced into the sample. Measurements are made on the ballast water. Therefore, after treatment with an effective amount of biocide, the NTU value of the ballast water will not show an increase of two or more units in approximately ten days or less after introduction of an inoculant.

Nitrogen containing blanketing agent produced by air separations units in combination with hydrocarbon processing facilities has advantages over nitrogen gases that can be produced by typical methods. For example, nitrogen can be generated through pressure swing absorption (PSA) and stored in liquid nitrogen tanks, and nitrogen can also be generated by cryogenic air separation. However, both operations are moderately expensive since they must be done onboard ships to provide the required nitrogen to blanket cargo and ballast tanks. In addition to the expense of producing the nitrogen on the ship, the operation of these units requires skilled people who must be stationed aboard the ship. A further complication to shipboard generation of nitrogen is the motion of the vessel. Nitrogen separation units, and in particular cryogenic air separation units, require use of compressors and distillation units. Such equipment is usually not designed to be operated with the motion that might be encountered onboard a ship.

Using the primarily nitrogen containing blanketing agent from air separation units associated with the processes to produce hydrocarbonaceous products to blanket tanks on marine vessels has several advantages. In Gas to Liquid processes, Heavy Hydrocarbon conversion processes, and methanol synthesis process, an air separation facility must be built to supply oxygen to the processes, and minor modifications in the air separation facility can be incorporated at modest cost to provide a supply of primarily nitrogen containing blanketing agent. The primarily nitrogen containing blanketing agent can be supplied as either a gas or preferably as a liquid. In comparison, providing nitrogen containing blanketing agent by specific nitrogen generation units located onboard a marine vessel is significantly more expensive, and these units are more difficult to operate. Likewise, one-purpose nitrogen generation units built onshore for the specific generation of nitrogen are more expensive than modifying the air separation units.

Also, air separation units are typically located in remote locations associated with the conversion of an energy source such as gas or coal into a portable form such as transportation fuel. This conversion is accomplished by the above-listed processes for producing hydrocarbonaceous products. Energy costs at the remote site are low and a major cost in air separation is energy. Therefore, the low energy cost associated with the remote location further reduces the cost of the nitrogen.

In addition, transport vessels naturally come to the facility in the usual course of their business of carrying petroleum or products from the GTL, Heavy Hydrocarbon Conversion, or Methanol Synthesis Facility to markets, therefore the nitrogen containing blanketing agent from the air separation units is readily available for loading on these marine vessels.

According to the present invention, a primarily nitrogen containing blanketing agent from an air separation unit, as liquid nitrogen or nitrogen gas, when used to blanket cargo and ballast tanks prevents oxidation, reduces corrosion, reduces product biodegradation, can control invasive species, and prevents fires and explosions by reducing the oxygen concentration in the cargo and ballast tanks of transport vessels.

To prevent danger to the crew from unknowing contact with the nitrogen containing blanketing agent, an odorant may be added to the gas prior to use. Since it is not easy to detect environments deficient in oxygen, and nitrogen asphyxiation has resulted in industrial fatalities.

Therefore, the nitrogen containing blanketing agent of the present invention may be odorized after separation from the air separation unit prior to its use on board marine vessels. The natural gas and liquefied petroleum gas (LPG) industries routinely odorize their products to alert customers of the hazards associated with the presence of the gas. Typical odorants are mercaptans, most commonly ethylmercaptan. The typical dose rate for ethylmercaptan in LPG is 1.5 pounds per 10,000 gallons.

Properties of mercaptans typically used as odorants are shown below:

| Mercaptan | Odor Threshold, ppm | Boiling Point, °F. | Water Solubility, % @ 20° C. |
|---|---|---|---|
| Methylmercaptan | 0.0011 | 40–45 | 2.4% |
| Ethylmercaptan | 0.00019 | 95 | 1.3 |
| Propylmercaptan | 0.000075 | 127 | Low |
| t-Butylmercaptan | 0.00008 | 146–149 | Negligible |

The ideal odorant should have as low an odor threshold as possible, as low a water solubility as possible, and as high a boiling point as possible, so that it is in the vapor phase. Accordingly, ethyl- and propyl-mercaptans are preferred.

If desired, the odorants can be obtained in the course of the Gas to Liquid process for making hydrocarbonaceous products, further integrating the process. These odorants can be recovered from the gas purification process used to provide the low sulfur methane gas converted in the GTL Facility. The process involves extraction with an alkali, separation, and neutralization with an acid, according to the following equations:

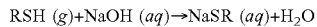

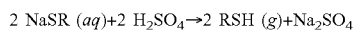

wherein R is an alkyl.

The extraction of mercaptans from the gas streams is a typical operation used in the gas purification process. The caustic mercaptides, NaSR, are oxidized to form disulfides, RSSR, and regenerate the caustic, NaOH. A portion of the mercaptide solution is contacted with acid to form a gas stream containing the mercaptan. After acidification, the mercaptan can be introduced into the nitrogen gas stream by simply sweeping the acidified solution with the nitrogen.

The present invention relates to a process for transporting these hydrocarbonaceous products derived from syngas. The process of the present invention comprises transporting the hydrocarbonaceous product from a first site to a second site remote from each other. The first site forms the hydrocarbonaceous product by a process comprising obtaining a hydrocarbon asset and separating air into primarily oxygen containing gas and a primarily nitrogen containing blanketing agent. The primarily nitrogen containing blanketing agent. The primarily oxygen containing gas is reacted with the hydrocarbon asset to form syngas. The syngas is converted to hydrocarbonaceous products. At least a portion of the hydrocarbonaceous product is transferred into at least one cargo tank on a transport vessel, and at least a portion of the primarily nitrogen containing blanketing agent is used to blanket at least one tank on the transport vessel during transportation. The hydrocarbonaceous product is transferred from the transport vessel to a storage containiner at the second site.

ILLUSTRATIVE EMBODIMENT

Referring to the FIGURE, at a production site, a hydrocarbon asset (10) is refined in facility (20) to provide a mixture of petroleum and gas (30), which is transported to a Gas-Liquids Separation Facility (30). This facility produces petroleum (40) and a methane-containing gas (60). The petroleum is pumped to a petroleum tanker (50) for shipment to a developed location. In addition to petroleum and gas, the Gas-Liquid Separation Facility frequently also produces water and condensate (not shown). The methane-containing gas (60) is sent to a GTL facility (65) where sulfur, nitrogen, and other non-hydrocarbon impurities are removed, providing a purified gas. The purified gas is then converted by a series of operations which require oxygen (100)—separated along with liquid nitrogen (110), containing less than 1 volume % oxygen, from air (90) in an Air Separation Unit (95)—to GTL products (70) that contain hydrocarbons boiling higher than pentane.

The series of operations in the GTL facility (65) typically include reacting the methane-containing gas (60) with oxygen (100) to form syngas (a gaseous mixture comprising CO and $H_2$), reacting the syngas in a Fischer-Tropsch process to form GTL products (70) that contain $C_{5+}$ hydrocarbons, and treating the GTL products (70) to reduce their olefin content, oxygen content, and pour point.

The GTL products (70) are then pumped to a GTL product tanker (80) for shipment to a developed location. The liquid nitrogen (110) is pumped to the petroleum tanker (50) and/or the GTL product tanker (80). There the liquid nitrogen (110) is compressed and gasified, and is used to reduce the oxygen content of the cargo and/or ballast tanks of the petroleum tanker (50) and/or the GTL product tanker (80). The gasification of the liquid nitrogen (110) is done by an electrical heater where the power is supplied by systems onboard the tanker(s).

Several modifications of this preferred embodiments are within the scope of this invention. For example, the petroleum tanker can be filled with petroleum from a different underground asset than the one used to generate the GTL product. The nitrogen can also be used to reduce the oxygen content of ballast and/or cargo tanks of other types of vessels such as ore carriers, coal carriers, and general cargo carriers. The underground asset could be coal which is gasified by use of oxygen supplied from an air separation unit. The transported product could be methanol rather than a $C_{5+}$ hydrocarbon containing product. In this case, a methanol synthesis process substitutes for the Fischer-Tropsch process and the purification step. Finally, other products such as Ar, Ne, Kr, and Xe can be derived from the air separation process. These inert gases can be sold or used to supplement the nitrogen for reduction in the oxygen content of tanks on ships.

Various modifications and alterations of this invention will become apparent to those skilled in the art without departing from the scope and spirit of this invention. Other objects and advantages will become apparent to those skilled in the art from a review of the preceding description.

What is claimed is:

1. An integrated process for the production and transportation of a hydrocarbonaceous product in a transport vessel containing one or more ballast tanks, one or more cargo tanks, and optionally one or more liquid nitrogen storage tanks, comprising the steps of:
   a) obtaining a hydrocarbon asset;
   b) separating air into a primarily oxygen containing gas and a primarily nitrogen
   c) reacting the primarily oxygen containing gas with the hydrocarbon asset to form syngas;
   d) converting the syngas into a hydrocarbonaceous product;
   e) transferring at least a portion of the hydrocarbonaceous product into at least one of the cargo tanks;
   f) transferring at least a portion of the primarily nitrogen containing blanketing agent to the transport vessel; and
   g) using at least a portion of the primarily nitrogen containing blanketing agent to blanket at least one of the tanks on the vessel.

2. A process according to claim 1, wherein the primarily nitrogen containing blanketing agent is used to blanket at least one ballast tank.

3. A process according to claim 1, wherein the primarily nitrogen containing blanketing agent is used to blanket at least one cargo tank.

4. A process according to claim 1, wherein the primarily nitrogen containing blanketing agent is a primarily nitrogen containing gas.

5. A process according to claim 1, wherein the syngas is converted to a hydrocarbonaceous product by a Fischer Tropsch process.

6. A process according to claim 1, wherein the syngas is converted to a hydrocarbonaceous product by a Methanol Synthesis process.

7. A process according to claim 1, wherein the primarily nitrogen containing blanketing agent comprises greater than 95 volume % nitrogen and less than 1 volume % oxygen.

8. A process according to claim 1, wherein the primarily nitrogen containing blanketing agent comprises greater than 98 volume % nitrogen and less than 0.1 volume % oxygen.

9. A process according to claim 1, wherein the primarily nitrogen containing blanketing agent is liquid nitrogen and is gasified prior to being used to blanket at least one of the tanks on the vessel.

10. A process according to claim 1, further comprising the step of adding an odorant to the primarily nitrogen containing blanketing agent.

11. A process according to claim 5, wherein the odorant is a mercaptan selected from the group consisting of ethylmercaptan, propylmercaptan, butylmercaptan, and mixtures thereof.

12. A process according to claim 1, further comprising the step of adding a biocide to the hydrocarbonaceous product.

13. A process for transporting a hydrocarbonaceous product, including a first site and a second site, remote from each other, wherein the first site forms the product to be used at the second site, wherein the process comprises:
  a. receiving at the second site the hydrocarbonaceous product, which is made at the first site by a process comprising:
    i. obtaining a hydrocarbon asset;
    ii. separating air into a primarily oxygen containing gas and a primarily nitrogen containing blanketing agent;
    iii. reacting the primarily oxygen containing gas with the hydrocarbon asset to form syngas;
    iv. converting the syngas to hydrocarbonaceous products;
    v. transferring at least a portion of the hydrocarbonaceous product into at least one cargo tank on a transport vessel; and
    vi. using at least a portion of the primarily nitrogen containing blanketing agent to blanket at least one tank on the transport vessel during transportation, wherein the tank is selected from the group consisting a cargo tank, a ballast tank, a liquid nitrogen storage tank, and combinations thereof; and
  b. transferring the hydrocarbonaceous product from the transport vessel to a storage container at the second site.

14. A process according to claim 13, wherein the primarily nitrogen containing blanketing agent is used to blanket at least one ballast tank.

15. A process according to claim 13, wherein the primarily nitrogen containing blanketing agent is used to blanket at least one cargo tank.

16. A process according to claim 13, wherein the primarily nitrogen containing blanketing agent comprises greater than 95 volume % nitrogen and less than 1 volume % oxygen.

17. A process according to claim 13, wherein the primarily nitrogen containing blanketing agent is liquid nitrogen and is gasified prior to being used to blanket at least one of the tanks on the vessel.

18. A process according to claim 13, wherein the syngas is converted to hydrocarbonaceous products by a Fischer Tropsch process.

* * * * *